United States Patent [19]

Nakamura et al.

[11] 4,445,964

[45] May 1, 1984

[54] APPARATUS FOR MANUFACTURING A STRING CONSTRUCTION

[75] Inventors: Masaaki Nakamura; Hisaaki Ueba, both of Tochigi, Japan

[73] Assignees: Kureha Kagaku Kogyo Kabushiki Kaisha, Nihonbashi; Kureha Gosen Kabushiki Kaisha, Mibu, both of Japan

[21] Appl. No.: 444,883

[22] Filed: Nov. 29, 1982

Related U.S. Application Data

[62] Division of Ser. No. 205,902, Nov. 12, 1980, abandoned.

[30] Foreign Application Priority Data

Nov. 16, 1979 [JP] Japan ............................... 54-147652
Oct. 15, 1980 [JP] Japan ............................... 55-144136

[51] Int. Cl.³ ............................................. B29D 23/04
[52] U.S. Cl. ................................. 156/500; 156/244.15
[58] Field of Search ............... 156/244.11, 244.15, 156/500; 264/174, 176 F, 177 R, DIG. 26, DIG. 75; 425/131.5, 376 B, 382 N, 382.2, 463, 464, 465, 466, DIG. 217

[56] References Cited

U.S. PATENT DOCUMENTS

| | | | |
|---|---|---|---|
| 3,051,989 | 9/1962 | Mercer | 156/500 |
| 3,118,180 | 1/1964 | Nalle | 156/500 |
| 3,308,220 | 3/1967 | Smith | 156/244.15 |
| 3,620,883 | 11/1971 | Nalle | 156/500 |
| 3,700,521 | 10/1972 | Gaffney | 156/244.15 |
| 3,957,565 | 5/1976 | Livingston et al. | 156/500 |

*Primary Examiner*—Caleb Weston
*Attorney, Agent, or Firm*—Wegner & Bretschneider

[57] ABSTRACT

A process for manufacturing a string construction having a core thread and a network thread around them by extruding thread-like molten resin streams from an extruding apparatus in which an inner spinneret formed with grooves at the outer circumferential surface is rotatably mounted to an outer spinneret formed with grooves at the inner circumferential surface, and the outer circumferential surface and the inner circumferential surface are slidingly contacted to each other.

10 Claims, 14 Drawing Figures

APPARATUS FOR MANUFACTURING A STRING CONSTRUCTION

This application is a divisional application of U.S. patent application Ser. No. 205,902, filed Nov. 12, 1980, now abandoned.

This invention relates to a process and an apparatus for manufacturing a string construction made of synthetic resins for use with athletic rackets, musical instruments and the like.

Natural strings for athletic rackets manufactured from animal muscles such as of intestinal muscles of sheep and of whale muscles are known. The strings of animal muscles or the gats are defective in that they are generally expensive and extremely poor in water proofness. While on the other hand, strings manufactured from thermoplastic resins are also known, and they are excellent in water proofness and have characteristics comparable with or superior to those of the strings from the animal muscles. However, such resin strings with smooth surface of synthetic resin monofilaments are not very much suited to athletic rackets since slips occur between the strings and a ball to bring about difficulty in applying driving, spinning and the like to the ball. Moreover, the monofilament strings, having no excellent dimensional stability, tend to slacken during use and they have to be replaced frequently In view of the above, it is also proposed to manufacture the strings from multifilaments, by which the above problems can be overcome to some extent. However, conventional process and apparatus for manufacturing multifilament strings proposed so far encountered difficulty for giving desired twisting and desired twisting pitch optionally, as well as for continuous production.

This invention has been made in view of the foregoings and an object thereof is to provide a process and an apparatus for manufacturing strings capable of optionally setting desired twisting and desired twisting pitch, as well as of continuous production.

Another object of this invention is to provide a process and an apparatus capable of manufacturing strings for athletic rackets, musical instruments and the like which are highly water proof and tough, and provided with a desired surface roughness. In the case where the strings manufactured by the process according to this invention are applied to athletic rackets, they can be stretched with ease on a racket frame and are free from dislocations in the mesh of the string net after the stretching, and the rackets stretched with such strings can surely hold a ball.

A further object of this invention is to provide a process and an apparatus capable of manufacturing strings having network threads with mesh in desired size.

This invention provides a process for manufacturing a string by melt spinning of synthetic fiber filaments using thermoplastic resin as starting material, which comprises preparing molten network threads on the outer side and molten twisted threads at the core by rotating a pair of an inside and outside spinneret engaged to each other in opposite directions, fusing them to each other just below the spinneret before they solidify, and then continuously conducting cooling solidification, stretching and heat treatment to them.

This invention also provides an apparatus for manufacturing a string for athletic rackets musical instruments and the like, which comprises a spinning device having an inner spinneret and an outer spinneret which are engaged to each other and rotated in opposite directions, and a quenching bath for the solidification of molten threads having a twisted thread and a network thread netted around them which are melt spun through the spinneret, a first roll, a stretching bath and a second roll for stretching, a heat treatment bath and a third roll for heat treatment, and a take-up device, which are disposed successively.

This invention further provides an extruding apparatus for manufacturing a string in which an inner spinneret is rotatably engaged into an outer spinneret with extruding grooves for molten thermoplastic resin being formed to each of the outer circumferential surface of the inner spinneret and the inner circumferential surface of the outer spinneret slidingly contacted to each other, and the inner spinneret is provided with through-holes from which the molten thermoplastic resin can be extruded independently from the rotation of the inner spinneret.

The process and the apparatus according to this invention can continuously produce strings for athletic rackets of desirable quality and low cost by melt-extruding synthetic resin started from thermoplastic resin such as, mainly, including fluoro resins, polyamide resins, polyester resins and the likes as the starting material through at least a pair of spinnerets in a spinning device, for example, from a nozzle comprising a pair of inner and outer spinnerets which are engaged to each other and rotated in opposite directions.

This invention is to be described by way of preferred embodiments referring to the drawings, by which the foregoing and other objects, as well as features of this invention will become clearer, in which FIG. 1 shows an apparatus for manufacturing strings;

Figure 1:
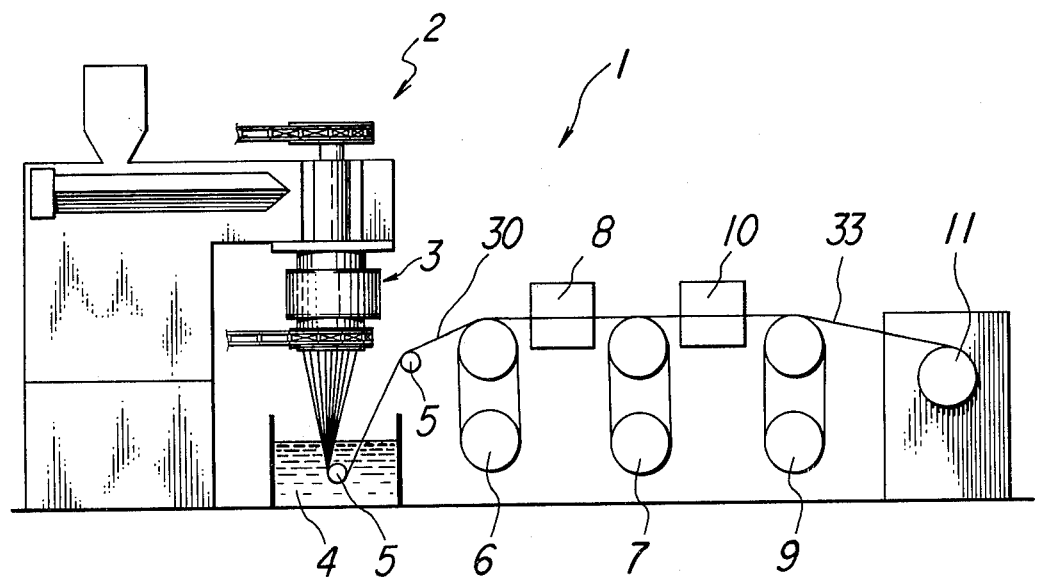
Figure 2:
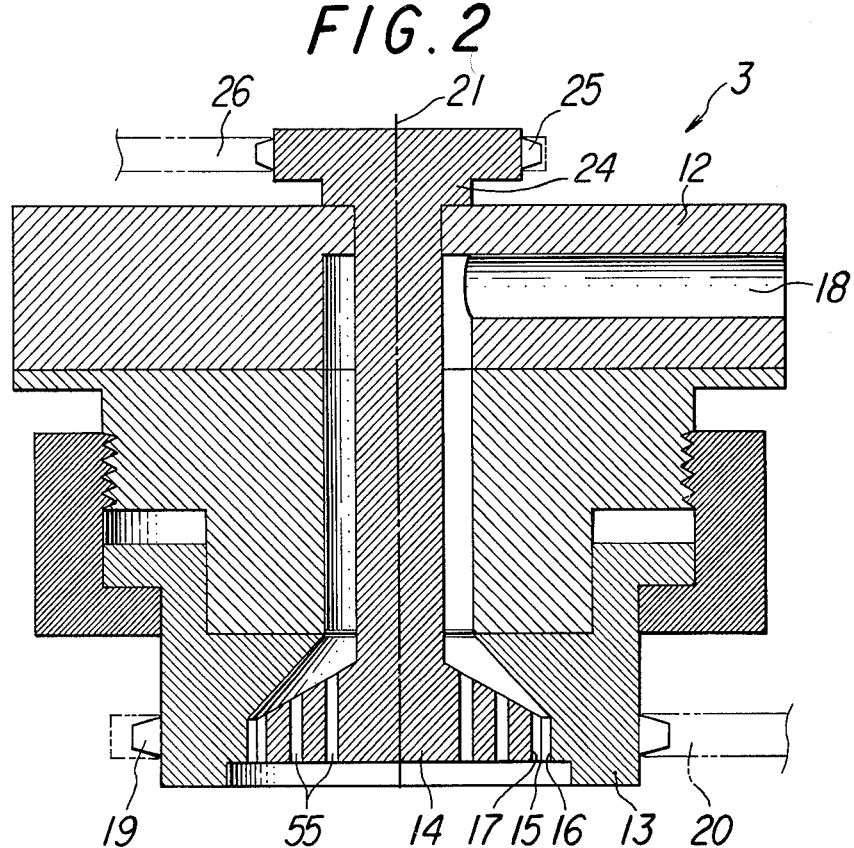
FIG. 2 shows the spinneret device shown in FIG. 1.
Figure 3:
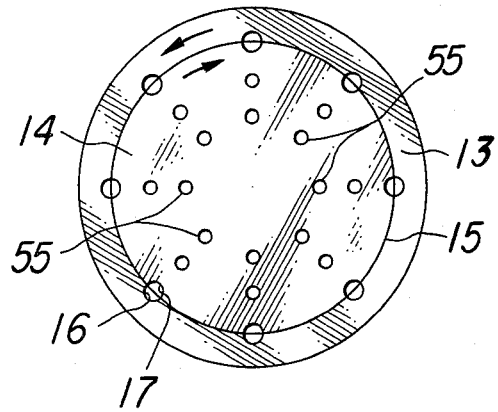
FIG. 3 is a bottom view of the spinning device shown in FIG. 2.
Figure 4:
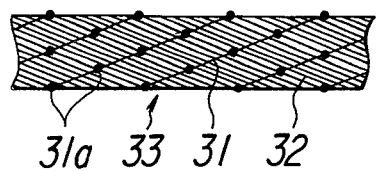
FIG. 4 shows a string manufactured by using the spinning device shown in FIG. 2.

In FIGS. 1 to 4, a string manufacturing apparatus 1 has an extruder 2 and a quenching bath 4 located below the spinning device 3 of the extruder 2. Guide rollers 5, 5 are provided within and downstream of the quenching bath 4. A stretching bath 8 is provided between a first roll assembly 6 and a second roll assembly 7 each having a pair of rolls. A heat treatment bath 10 is provided between the second roll assembly 7 and a third roll assembly 9 also having a pair of rolls, and a string take-up device 11 is provided at the downstream of the third roll 9.

The extruder 2 extrudes through the spinning device 3 molten thermoplastic resin, preferably, such thermoplastic resin as fluoro resin, polyamide resin and polyester resin. The spinning device 3 comprises a main body 12, an outer spinneret 13 rotatably mounted to the main body 12 and an inner spinneret 14 rotatably mounted to the outer spinneret 13. The outer spinneret 13 and the inner spinneret 14 are slidingly contacted to each other in a liquid tight manner at the annular boundary 15 between them defined with the inner circumferential surface of the outer spinneret 13 and the outer circumferential surface of the inner spinneret 14. The outer spinneret 13 is formed with outer grooves 16 at the inner circumferential surface for extruding molten thermoplastic resin and the inner spinneret 14 is formed with corresponding inner grooves 17 at the outer circumferential surface for extruding molten thermoplastic resin. A passage 18 formed in the body 12 of the spinning device 3 is communicated by way of the grooves 16 and 17 to the outside. The outer spinneret 13 is formed at its outer circumferential surface with teeth 19 which are engaged with a chain 20, and it rotates around a center axis 21 when the chain 20 is driven by a driving mechanism not shown. The inner spinneret 14 has a plurality of nozzle apertures or through holes 55 for forming twisted threads perforated therein which communicate the passage 18 to the outside of the spinning device 3. The molten thermoplastic resin in the passage 18 is extruded externally also by way of the nozzle apertures 55. The spinneret 14 is extended at one side as a shaft 24 within the passage 18 and the shaft 24 formed at its upper end with teeth 25 which are engaged to a chain 26. When the chain 26 is driven by a driving device not shown, the inner spinneret 14 rotates around the center axis 21.

The apparatus having the constitution above mentioned operates as below. The chains 20 and 26 are driven respectively and the outer spinneret 13 and the inner spinneret 14 are rotated in opposite directions to each other. Then, molten thermoplastic resin is introduced through the feeding passage 18 and extruded externally by way of the grooves 16 and 17 on one hand and by way of the nozzle apertures 55 on the other hand. Since the grooves 16 and 17 form full circular apertures when aligned with each other and form semi-circular apertures when displaced from each other depending on the rotation of the spinnerets 13 and 14, molten thread-like resin streams extruded from the grooves 16 and 17 form a network and are fused to each other at their aligning points 31a.

While on the other hand, a plurality of molten thread-like resin streams extruded from the nozzle apertures 55 are twisted into molten twisted resin threads.

The molten network resin from the grooves 16 and 17 and the molten twisted resin from the nozzle apertures 55 are collected to contact to each other above the quenching bath 4 before entering it or within the quenching bath 4. In the case where they are collected to contact above the bath 4, the molten network resin and the molten twisted resin are fused to each other and then cooled to solidity by cold water in the bath 4. While on the other hand, in the case where they are collected to contact within the bath 4, they are cooled to solidify while the molten network resin and the molten twisted resin are not fused and the molten twisted resin are not fused to each other. A string 30 formed by the solidification is wound around the roll 6 by way of the guide rolls 5, 5, passed through the stretching bath 8 and again wound around the roll 7. The string 30 is applied with heat-stretching due to the difference between the rotating speeds of the roll 6 and the roll 7. Then, the string 30 is introduced into the heat treatment bath 10 for heat setting and, thereafter, pulled by the roll 9. Thus, a string 33 having a twisted thread bundle 32 netted with network threads 31 is obtained and the string 33 is taken-up into the take-up device 11.

The manufacturing apparatus 1 mentioned above can produce the string continuously. Heating conditions, rotating speeds of the spinnerets 13 and 14, the rotating speed of the rolls 6, 7 and 9 and the likes are determined depending on the type of the thermoplastic resin employed, the configuration, for example, the diameter of the string to be manufactured and the like.

Figure 5:
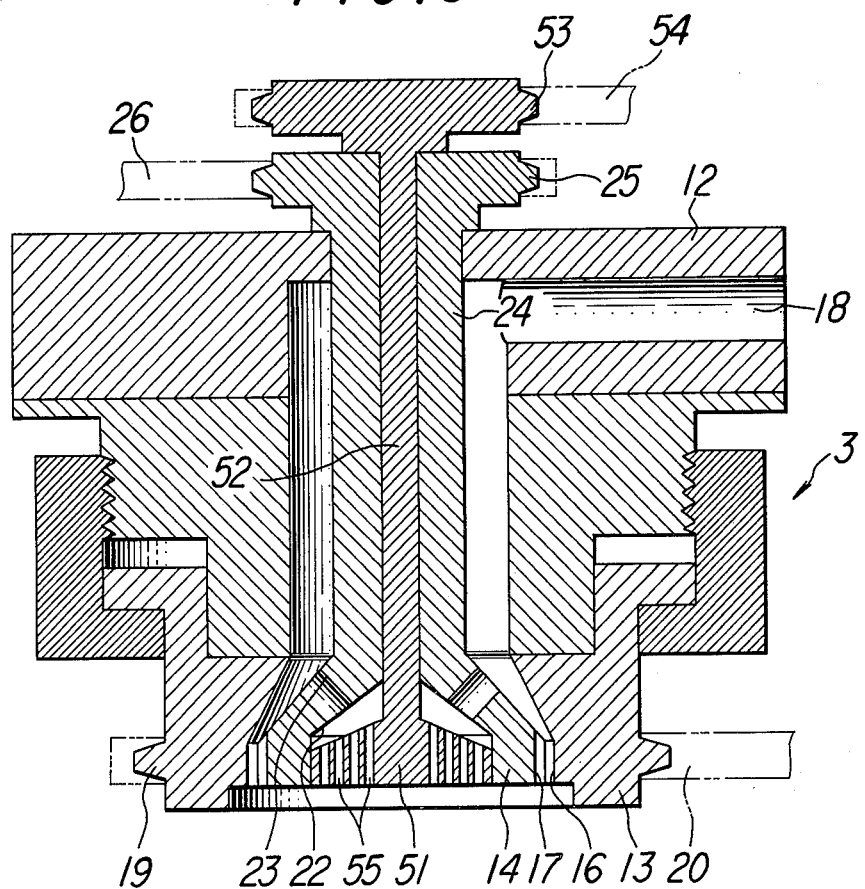
FIG. 5 shows another embodiment of the spinning device.
Figure 6:
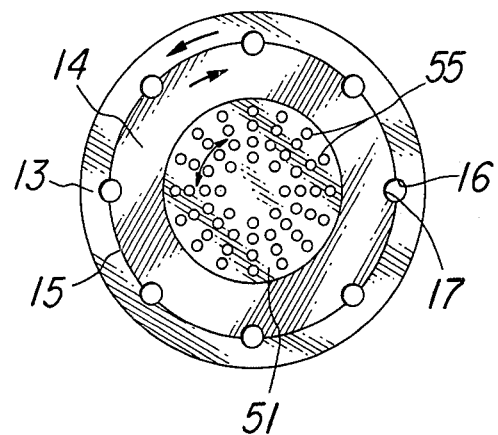
FIG. 6 is a bottom view of the spinneret device shown in FIG. 5.

In the extruder 2 of this embodiment, it is difficult to vary the twisting pitch for the thread bundle 32 formed from the nozzle apertures 55 relative to the pitch for the network threads 31 formed from the groove 17. Then, the spinning device 3 of the extruder 2 shown in FIG. 5 and FIG. 6 is constituted such that the twisting pitch for the thread bundle 32 can optionally be set independently from the pitch for the network thread 31. That is, in the spinning device 3 shown in FIG. 5 and FIG. 6, the inner spinneret 14 is formed with a recess 22, which is communicated with the passage 18 by way of through holes 23 formed in the inner spinneret 14 and a central spinneret 51 is rotatably engaged in a liquid tight manner to the inner spinneret 14. The central spinneret 51 is extended as a shaft 52 passing through the shaft 24 and the upper end of the shaft 52 is formed with teeth 53, to which a chain 54 is engaged so that the central spinneret 51 is rotated by the running of the chain 54. Further, the central spinneret 51 has a plurality of nozzle apertures 55 formed therein.

Figure 7:
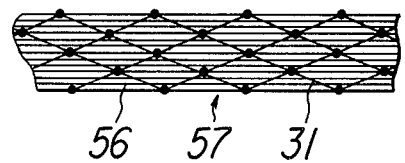
FIG. 7 and FIG. 8 show strings manufactured by using the spinning device shown in FIG. 5.
Figure 8:
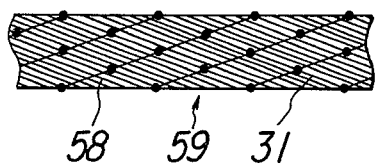

In the spinning device 3 constituted as above, since the molten thermoplastic resin supplied through the through holes 23 is extruded by way of the recess 22 from the nozzle apertures 55, the extrusion can be conducted independently from the rotation of the inner spinneret 14. This extrusion of a plurality of thread-like molten resin streams may be conducted either by extruding them through the nozzle apertures 55 without rotating the central spinneret 51 or by extruding them through the apertures 55 while rotating the central spinneret 51 in the direction equal or opposite to that of the inner spinneret 14. Further, the rotating speed of the central spinneret 51 may be the same as or different from that of the spinneret 13 or 14. In the case where the extrusion is conducted without rotating the central spinneret 51, a string 57 having a non-twisted bundle 56 netted with the network threads 31 is obtained as shown in FIG. 7 and, while on the other hand, in the case where the extrusion is conducted while rotating the central spinneret 51, a string 59 having a twisted thread-like bundle 58 netted with the network threads 31 is obtained as shown in FIG. 8. By the provision of the central spinneret 51, the thermoplastic resin extruded from the through holes 23 can be rendered independent from the rotation of the spinneret 14, by which string having central thread bundles or cores with various twisting pitches different from the pitch for the network threads can be produced.

Figure 9:
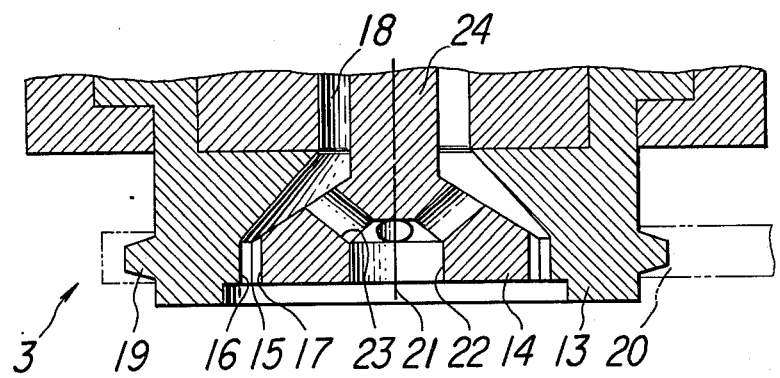
FIG. 9 shows a further embodiment of the spinning device.
Figure 10:
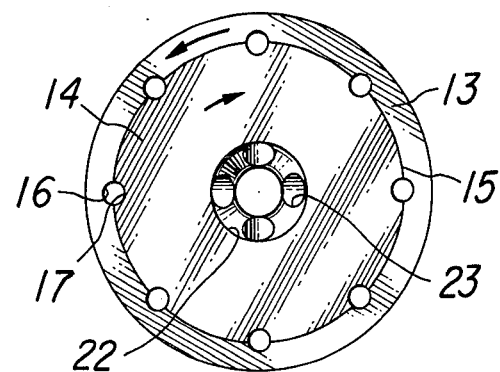
FIG. 10 is a bottom view of the spinning device shown in FIG. 9.

The spinning device 3 of the extruder 2 can also be formed as shown in FIG. 9 and FIG. 10, in which a recess 22 having a smooth spherical inner surface is provided to an inner spinneret 14 without providing the central spinneret 51 mentioned above in this case and the recess 22 is communicated with the passage 18 by way of through holes 23. Since the spinning device 3 in this embodiment has the recess 22 with the smooth spherical inner surface, the molten resin is extruded from the recess 22 with no substantial twisting due to the rotation of the inner spinneret 14, that is, a nontwisted single molten thread-like resin is extruded from the recess 22.

Figure 11:
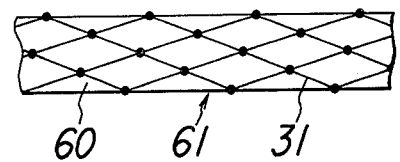
FIG. 11 shows a string manufactured by using the spinning device shown in FIG. 9.

By forming the recess 22 with such a smooth inner surface, the molten thermoplastic resin extruded from the through holes 23 can be obtained independently with no substantial effects by the rotation of the inner spinneret 14 and, as the result, a string 61 having a single thread 60 netted with the network threads 31 can be manufactured as shown in FIG. 11.

The spinning device 3 shown in FIG. 5 and FIG. 6 can also be modified by forming a recess similar to the recess 22 to the central spinneret 51 instead of forming a plurality of nozzle apertures 55 in the central spinneret 51 and extruding the molten thermoplastic resin from the through holes 23 through this recess, by which the string 61 as shown in FIG. 11 can also be manufactured.

Figure 12:
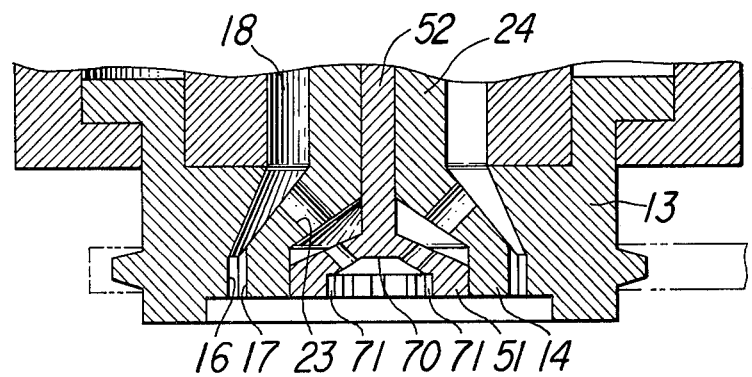
FIG. 12 shows a still further embodiment of the spinning device.
Figure 13:
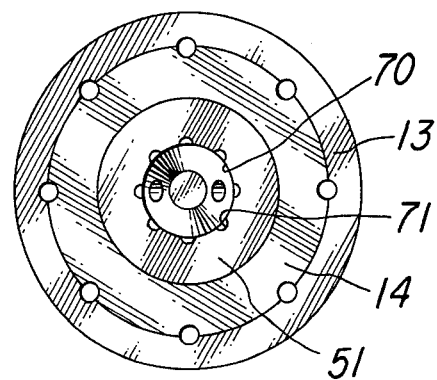
FIG. 13 is a bottom view of the spinning device shown in FIG. 12.
Figure 14:
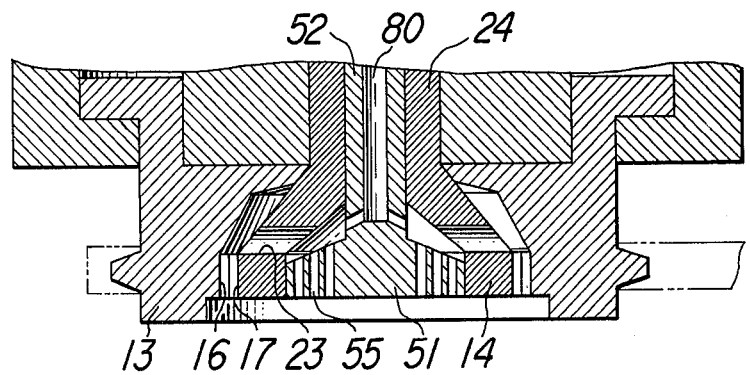
FIG. 14 shows a still further embodiment of the spinning device.

Further, the spinning device 3 can also be modified as shown in FIG. 12 and FIG. 13, in which axial grooves 71 are formed on the periphery of a recess 70 provided in a central spinneret 51 so that the resin is extruded by way of the recess 70. The string 57 or 59 shown in FIG. 7 or FIG. 8 can be manufactured in an equivalent manner in this embodiment. Although the feeding passage 18 is provided on the main body 12 in each of the foregoing embodiments, a passage 80 can also be formed, for example, as shown in FIG. 14 on a shaft 52 and the resin may be supplied from the passage 80 radially outwardly to nozzle apertures 55 and grooves 16 and 17. In this embodiment, the molten resin can be supplied substantially uniformly to the nozzle apertures 55 and to the grooves 16, 17 upon rotation of the central spinneret 51, by which more favorable strings can be manufactured.

Further, the outer spinneret 13, the inner spinneret 14 and the central spinneret 51 may be rotated either independently from each other or synchronized by connecting them, for example, with gears or the like. In the synchronized rotation, individual gear ratios may optionally be changed.

What is claimed is:

1. An apparatus for manufacturing a string having an extruding device comprising a main body, an outer spinneret rotatably mounted on the main body, an inner spinneret rotatably mounted on the outer spinneret and driving means for rotating at least one of the outer spinneret and the inner spinneret around the axis of the spinnerets as a center, the outer circumferential surface of the inner spinneret and the inner circumferential surface of the outer spinneret slidingly contacting each other and each having respectively formed therein at least one groove for extruding thread-like molten resin streams, the inner spinneret being provided with a through hole and with a recess communicating with the through hole, a single thread-like molten resin stream being extruded from the recess, and the groove and the through hole communicating with a passage for supplying the molten resin thereto.

2. The apparatus for claim 1, in which the number of grooves on the inner spinneret and the outer spinneret is equal and the grooves are arranged at an equal pitch along the circumferences of the spinnerets.

3. The apparatus of claim 1, in which a plurality of through holes are provided through which a plurality of thread-like molten resin streams are extruded.

4. The apparatus of claim 1, in which an axial groove is formed in the recess of the inner spinneret.

5. The apparatus of claim 1, in which the inner spinneret is provided with a first recess communicating with the through hole, a central spinneret is rotatably mounted within the recess of the inner spinneret, a second recess communicating with the first recess is formed in the central spinneret and a single thread-like molten resin stream is extruded through the second recess.

6. The apparatus of claim 5, in which an axial groove is formed in the second recess of the central spinneret.

7. The apparatus of claim 1, in which a recess communicating with the through hole is provided in the inner spinneret, a central spinneret is rotatably mounted within the recess to the inner spinneret, a plurality of second through holes communicating with the recess are formed in the central spinneret and the plurality of thread-like molten resin streams are extruded from the second through holes.

8. The apparatus of claim 6 or 7, in which the inner spinneret is provided with a first rotational shaft which axially extends through the passage, the driving means is connected to a free end of the first rotational shaft, the central spinneret has a second rotational shaft which further axially extends within the first rotational shaft and a second driving means is connected to a free end of the second rotational shaft.

9. The apparatus of claim 8, in which the driving means is connected to the outer circumferential surface of the outer spinneret.

10. The apparatus of claim 8, in which the passage for supplying the molten resin is provided in the second rotational shaft.

* * * * *